UNITED STATES PATENT OFFICE.

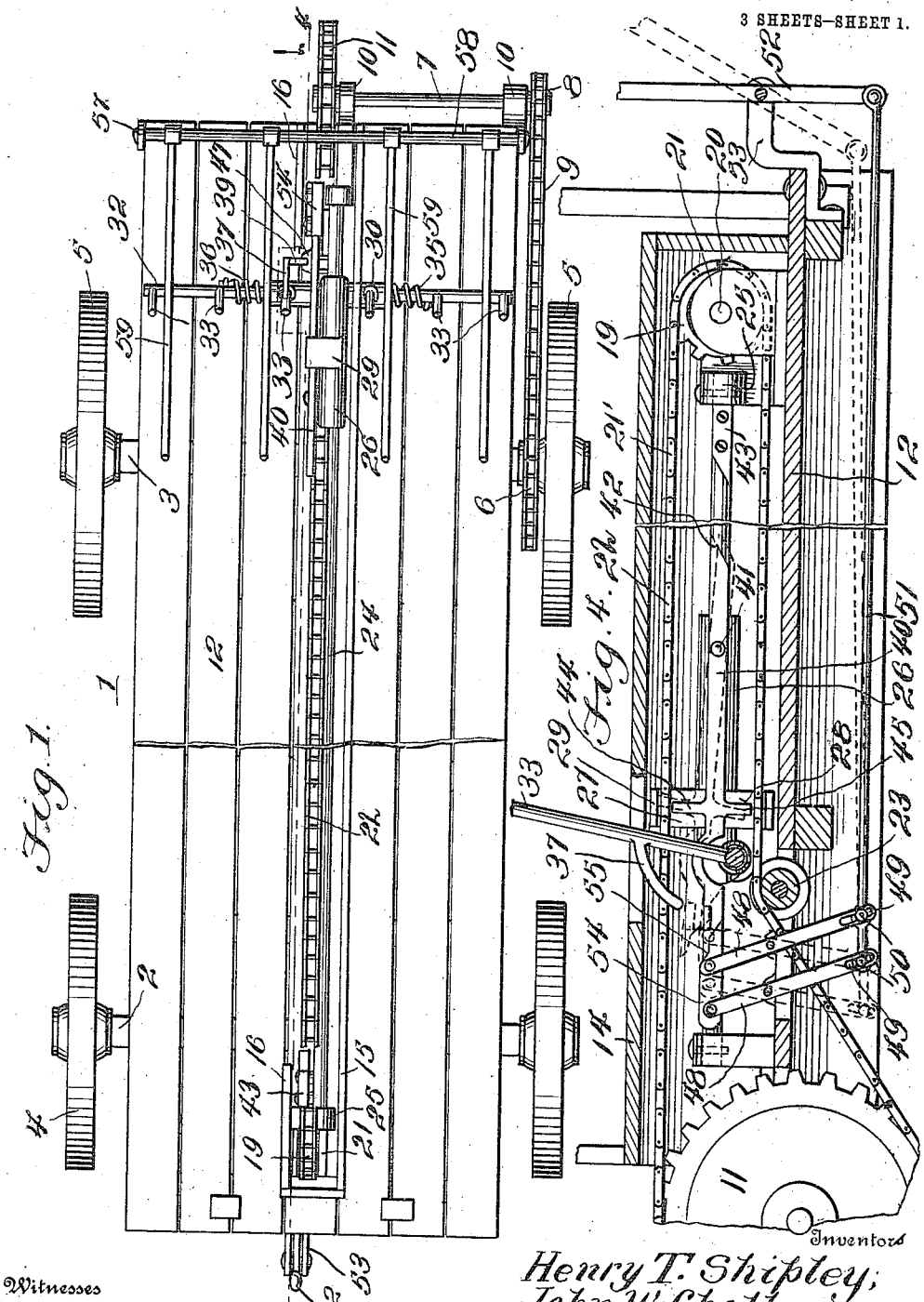

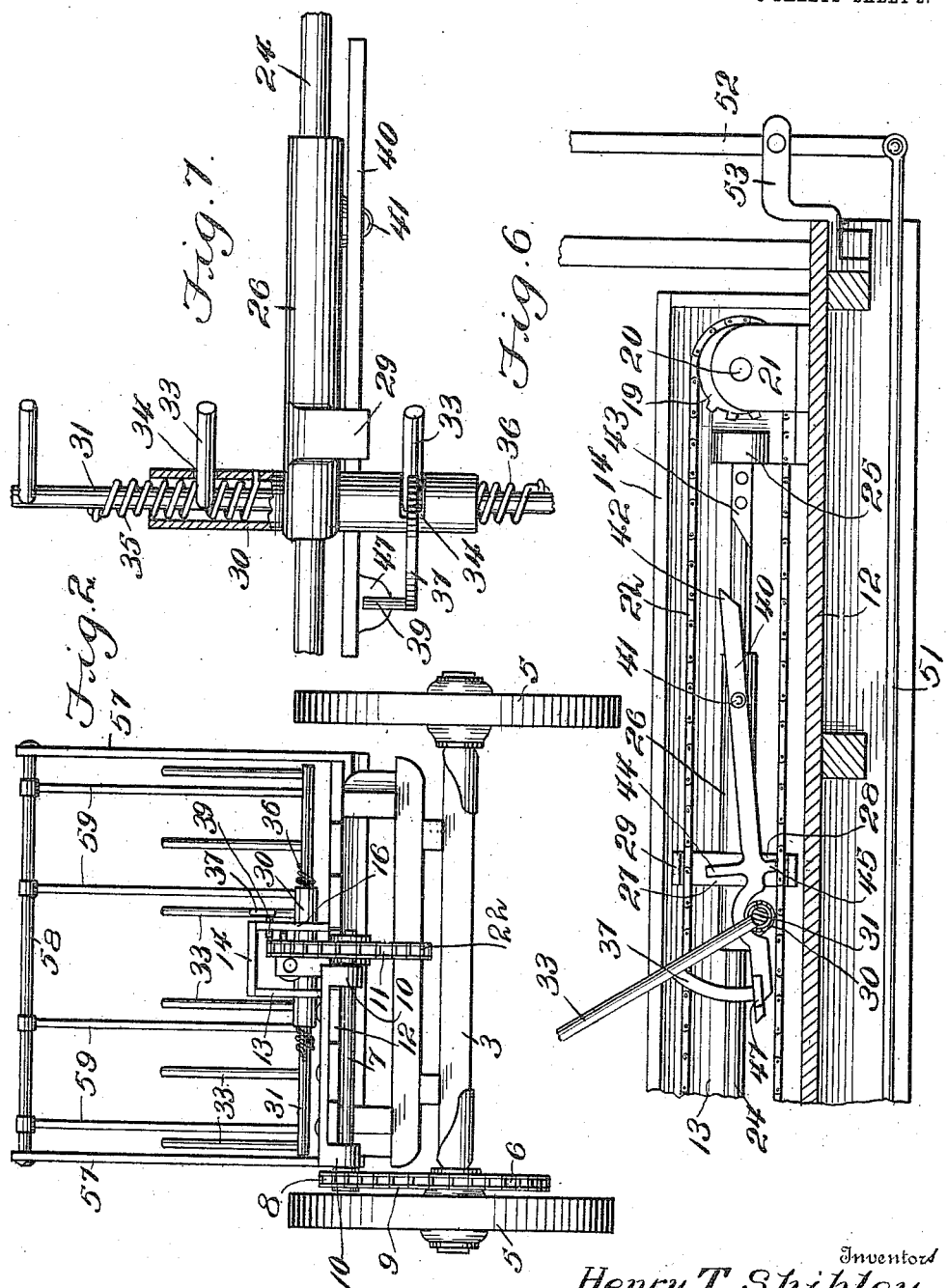

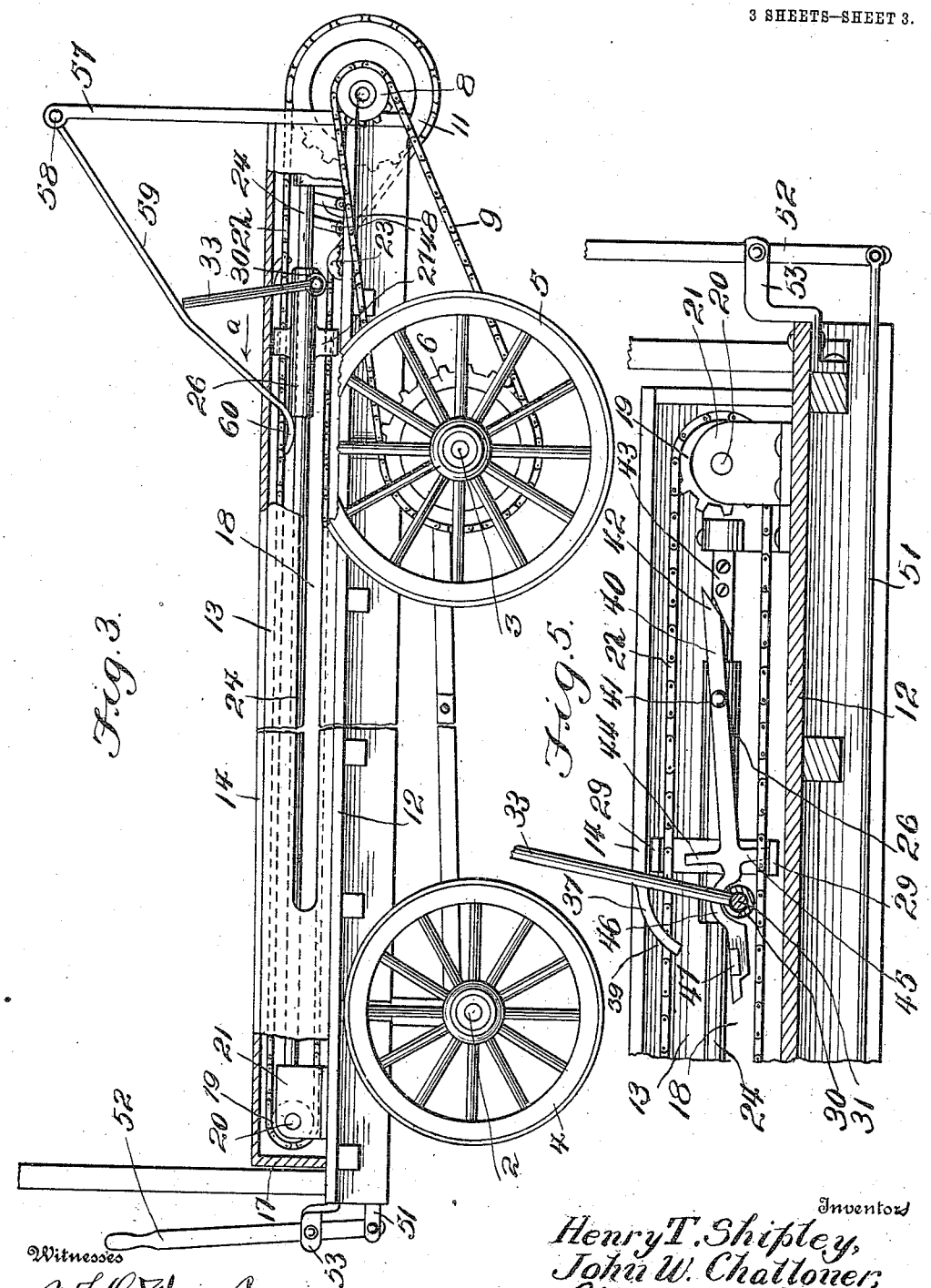

HENRY T. SHIPLEY AND JOHN W. CHALLONER, OF OSHKOSH, WISCONSIN.

HAY-LOADER.

986,230.     Specification of Letters Patent.     Patented Mar. 7, 1911.

Application filed September 17, 1908. Serial No. 453,567.

*To all whom it may concern:*

Be it known that we, HENRY T. SHIPLEY and JOHN W. CHALLONER, citizens of the United States, residing at Oshkosh, in the county of Winnebago and State of Wisconsin, have invented new and useful Improvements in Hay-Loaders, of which the following is a specification.

This invention relates to hay loaders, and has for an object to provide means attached to or made part of a movable truck or similar portable body, which means, may be effectively employed for the purpose of forming hay in a compact mass along the body of said truck, which hay may be automatically fed toward the front end of said truck after the same has been deposited at the rear end thereof.

A further object of this invention is to provide a novel feed mechanism that can receive its power through the medium of a drive chain or the like which may be geared or connected with the hub of one of the ground wheels of the truck.

A further object is to provide a longitudinally movable material carrying carriage which can be thrown into an operative position upon depositing material thereon, and to provide means whereby said carriage may be automatically thrown into an inoperative position and returned to receive another load.

Other objects and advantages will be apparent as the nature of the invention is better disclosed, and it will be understood that changes in the specific structure may be resorted to within the scope of the claims without departing from the spirit of the invention.

In the drawings, forming a portion of this specification and in which like numerals of reference indicate similar parts in the several views,—Figure 1 is a top plan view, Fig. 2 is a rear end view, Fig. 3 is a side view, parts being shown in section, Fig. 4 is a view taken on the line 4—4 of Fig. 1, parts being shown on an enlarged scale, Fig. 5 is a view similar to Fig. 4, showing the parts in a different position, Fig. 6 is a similar view, Fig. 7 is a detail view of the carriage.

Referring now more particularly to the drawings, there is shown a loading device which in the present instance, is in form of a portable truck 1 provided with a front axle 2, and a rear axle 3, the axle 2 being provided with suitable ground wheels 4 and the axle 3 being provided with similar wheels 5. Upon the hub of one of the wheels 5 there is mounted a large sprocket wheel 6, and rearwardly of said sprocket wheel and mounted upon a stub shaft 7 is a second sprocket wheel 8 disposed in line with the wheel 6. The just described sprocket wheels have connected therewith a drive chain or belt 9. The shaft 7 is mounted in suitable bearings 10 at the rear of the truck, and said shaft is provided with a larger sprocket wheel 11 located centrally of the floor 12 of said truck. Hereinafter the wheel 6 will be referred to as a drive wheel and a wheel 8 will be referred to as the driven wheel, and its shaft a driven shaft.

A housing 13 is mounted upon the floor of the truck and extends longitudinally thereof, is relatively narrow and comprises a top 14, sides 15 and 16 respectively, and a front end 17. The side walls 15 and 16 of the housing have formed therein longitudinally extending slots 18 for a purpose to be hereinafter described.

A sprocket wheel 19 is located at the front end of the truck, is disposed in the housing and is mounted upon a shaft 20 journaled in a bearing bracket 21 which is secured to the floor of the truck in any suitable manner, and over the sprocket 11 is an endless chain 22 composed of the ordinary pivotally mounted links. A tension roller 23 is provided for engagement with the chain 22 to hold the same against accidental displacement from its sprockets. A rod 24 is located in the housing and has its ends mounted in suitable brackets 25 by means of which said rod is held in spaced relation to the platform of the truck. The rod 24 has mounted thereon a sliding carriage which comprises an elongated tubular body 26 having members 27 and 28 extending therefrom, and these members are provided at their outer ends with right angularly disposed portions 29. It will be seen that the portions 29 of said members are located above and below the chain 22.

The carriage is provided with a transversely disposed tubular portion 30 which is similar to the portion 26 and is disposed beneath the rod 24, as shown. The tubular portion 30 has mounted therein a transversely extending rod 31 having portions 32 extending outwardly beyond the ends of said portion 30, and this rod carries a plurality of arms 33. The portion 30 is mounted for movement in the slots 18 formed in the side walls of the housing previously described, and the rod 31 is thus adapted to extend transversely of the floor of the truck as is obvious. The portion 30 of the carriage is provided with arcuate slots 34 which receive a plurality of the arms 33. Helical springs 35 and 36 respectively, are provided, and these springs each have one end connected to the portion 30 of the carriage and the other end of each spring is connected to the rod 31. One of the arms 33 is provided with an arcuate finger 37 which carries at its lower end a pin 39.

An arm 40 is pivotally mounted as at 41 on the carriage 26. The arm 40 is pivoted off its center and its forward end is beveled to form a cam face 42 for coöperation with a cam 43 located adjacent to the rod 24 at one end thereof. The arm 40 is provided with an upwardly projecting finger 44 and a similar downwardly projecting finger 45, and rearwardly of these fingers the arm is curved in arched from as indicated at 46 to straddle the portion 30 of the carriage. Rearwardly of the portion 46, the arm carries a stud or lug 47 located in the path of movement of the pin 39.

A pair of links 48 is pivotally mounted upon the floor of the truck, and these links are provided with curved slots 49 at their lower ends which receive pins 50 carried by a longitudinally extending rod 51 located beneath the floor of the truck and pivotally connected at its front end to an operating lever 52 which is pivotally connected to a bracket 53 secured to the truck in any suitable manner. The links have connected thereto at their upper ends a dog 54 provided with inclined faces 55 for engaging similar faces at the rear end of the arm 40.

Brackets 57 extend upwardly in a vertical plane from the floor of the truck and these brackets have loosely mounted therein the ends of a transversely extending shaft 58 provided with a plurality of downwardly and forwardly directed fingers 59 having curved outer extremities 60, as shown. The arms 33 are thus adapted to work between the fingers 59 as will be readily understood.

In operation, material is fed upon the floor of the truck from the rear end thereof, is carried downwardly upon the fingers 59 and is simultaneously deposited forwardly of the arms 33 as will be seen upon reference to Figs. 1 and 3 of the drawings. It will of course be understood that the material is fed to the truck after the carriage has been returned to the position shown in Fig. 3 of the drawings. The material will occupy a position at the lower end of the fingers 59 and it will be disposed directly in the path of the arms 33 to be collected thereby. The position of the carriage 26, as shown in Figs. 1 and 3, is such that it may be moved in the direction of the arrow $a$ as shown in Fig. 3 of the drawings, it being understood that the lever 52 has been previously operated to engage the finger 44 in the upper portion of the chain 22. It will thus be seen that the carriage is effectively held in a position to travel toward the front of the truck. After said carriage has reached a point where its arm 40 will have its cam face 42 engaged with the cam 43 it will be seen that the arm will be moved in a position to carry the finger 45 thereof in a downward direction to be engaged with one of the links of the chain to automatically effect the return movement of said carriage. The tension of the springs 35 and 36 is such that the arms will be held normally against considerable pressure, but after material begins to pack along the body of the truck the arms will be moved against the tension of said springs and will carry therewith the finger 39 and move the same in a downward direction to engage the lug 47 on the arm 40 to carry the finger 45 of said arms in a downward direction, as shown in Fig. 6 of the drawings.

While the invention is used particularly in connection with the loading of hay, it is obvious that the same may be used upon farms or like places for the handling and loading of any material, as is obvious.

We claim:

1. In loading apparatus, a platform, an endless feed chain extending longitudinally of the platform, a carriage, a rock shaft on the carriage, a rock arm on the carriage, an upper member on the rock arm for engaging the chain to cause the carriage to move in one direction, a lower member on the rock arm to engage the chain to cause the carriage to move in an opposite direction, and shifting mechanism operating to move the rock arm to change the engagement of the said chain-engaging members with the chain.

2. In loading apparatus, a platform, an endless chain mounted on the platform, driving means therefor, a carriage movable on the platform and comprising an elongated tubular body having a pivoted arm thereon, a spring tension shaft supported by the carriage, a plurality of collecting arms extending from the shaft, an arcuate finger carried by one of the collecting arms, means on the pivoted arm to be engaged with the chain to impart movement to the carriage, the said pivoted arm having its forward end beveled to form a cam surface, a cam surface on the platform and disposed in the path of movement of the first named cam surface so as to move the said pivoted arm to shift the position of the said chain-engaging means thereon to impart opposite movement to the carriage, said arcuate finger under tension of the shaft being normally held in an elevated position above the said pivoted arm, and means on the pivoted arm to be engaged by the said arcuate finger so as to change its engagement with the chain to cause the carriage to move in an opposite direction.

In testimony whereof we affix our signatures in presence of two witnesses.

HENRY T. SHIPLEY.
JOHN W. CHALLONER.

Witnesses:
A. J. BARBER,
TILLIE HANSON.

Copies of this patent may be obtained for five cents each, by addressing the "Commissioner of Patents, Washington, D. C."